(12) United States Patent
Morinaga

(10) Patent No.: US 8,601,078 B2
(45) Date of Patent: Dec. 3, 2013

(54) COMMUNICATION TERMINAL AND METHOD FOR CREATING E-MAIL

(75) Inventor: Yasuo Morinaga, Kawasaki (JP)

(73) Assignee: NTT DoCoMo, Inc., Tokyo (JP)

( * ) Notice: Subject to any disclaimer, the term of this patent is extended or adjusted under 35 U.S.C. 154(b) by 153 days.

(21) Appl. No.: 13/256,815

(22) PCT Filed: Feb. 17, 2010

(86) PCT No.: PCT/JP2010/052366
§ 371 (c)(1),
(2), (4) Date: Oct. 19, 2011

(87) PCT Pub. No.: WO2010/106864
PCT Pub. Date: Sep. 23, 2010

(65) Prior Publication Data
US 2012/0265826 A1  Oct. 18, 2012

(30) Foreign Application Priority Data
Mar. 16, 2009  (JP) ................ P2009-062721

(51) Int. Cl.
*G06F 13/00* (2006.01)
(52) U.S. Cl.
USPC .......................... 709/206; 709/219
(58) Field of Classification Search
USPC ................. 709/204, 206, 217, 219
See application file for complete search history.

(56) References Cited

U.S. PATENT DOCUMENTS

| 6,085,201 A * | 7/2000 | Tso ............... 715/205 |
| 2006/0245555 A1* | 11/2006 | Makela ............. 379/88.12 |
| 2009/0037541 A1* | 2/2009 | Wilson ............. 709/206 |

FOREIGN PATENT DOCUMENTS

| EP | 1 783 627 A1 | 5/2007 |
| JP | 63 214871 | 9/1988 |
| JP | 05 282253 | 10/1993 |
| JP | 06 096056 | 4/1994 |
| JP | 2000-235533 | 8/2000 |
| JP | 2000-305702 A | 11/2000 |
| JP | 2001-101162 | 4/2001 |
| JP | 2007 272739 | 10/2007 |
| JP | 2008-171068 A | 7/2008 |

OTHER PUBLICATIONS

International Search Report issued May 11, 2010 in PCT/JP10/052366 filed Feb. 17, 2010.
English translation of the International Preliminary Report on Patentability issued Oct. 27, 2011, in PCT/JP2010/052366.
English translation of the Written Opinion of the International Searching Authority issued May 11, 2010, in PCT/JP2010/052366.
Extended European Search Report issued Nov. 7, 2012 in Patent Application No. 10753359.8.

(Continued)

*Primary Examiner* — Viet Vu
(74) *Attorney, Agent, or Firm* — Oblon, Spivak, McClelland, Maier & Neustadt, L.L.P.

(57) ABSTRACT

In a communication terminal, an extraction section extracts predetermined keyword data from text data input for an e-mail, an acquiring section acquires predetermined associated data associated with the keyword data extracted by the extraction section from an internal memory (such as a RAM or a storage device) of the communication terminal or from predetermined external equipment through a communication device, based on storage location reference data that indicates the storage location of the associated data and is stored in the internal memory, and an inserting section inserts the associated data acquired by the acquiring section into the text data in place of the keyword data. With this communication terminal, an input operation necessary to create an e-mail can be performed efficiently.

9 Claims, 6 Drawing Sheets

(56) References Cited

OTHER PUBLICATIONS

Anonymous, "Getting Started/ All Tags/ Sharing Templates", WebArchive Webpage, Retrieved from the Internet: URL:http://web.archive.org/web/20090226060546/http://extensions.hesslow.se/text/4/Getting+Started/All+Tags/Sharing+Templates [retrieved on Oct. 30, 2012], XP55042626A, Feb. 26, 2009, 8 pages.

Anonymous, "Customizing Emails", WebArchive Webpage, Retrieved from the internet: URL:http://web.archive.org/web/20081201115837/http://www.blackthornesw.com/robo/projects/blackthornepro/Customizing_Emails.htm [retrieved on Oct. 30, 2012], XP 55042617A, Dec. 1, 2008, 6 pages.

Japanese Office Action issued Jul. 24, 2012, in Patent Application No. 2009-062721 (with English-language translation).

Japanese Office Action issued Oct. 9, 2012 in Patent Application No. P2009-062721 with English Translation.

Office Action issued Jun. 21, 2013 in European Patent Application No. 10753359.8.

\* cited by examiner

*Fig.3*

| KEYWORD | KEYWORD TYPE |
|---|---|
| WEATHER | VARIABLE DATA DB/WEATHER |
| SCHEDULE | SCHEDULE DATA DB |
| DATES | SCHEDULE DATA DB |
| NEWS | VARIABLE DATA DB/NEWS |
| GREETING | VARIABLE DATA DB/GREETING |

*Fig.4*

| TITLE | STORAGE LOCATION |
|---|---|
| WEATHER | :info/weather/detail |
| NEWS | :info/news/top |
| FORTUNE TELLING | :info/fortune/gemini |
| SPORTS | :info/sports/top |

Fig.5

| TIME SLOT | GREETING WORD |
|---|---|
| 6:00〜11:59 | GOOD MORNING |
| 12:00〜18:59 | HELLO |
| 19:00〜21:59 | GOOD EVENING |
| 22:00〜1:59 | I'M SORRY TO BOTHER YOU SO LATE AT NIGHT |
| 2:00〜5:59 | YOU MUST BE SLEEPING |

COMMUNICATION TERMINAL AND METHOD FOR CREATING E-MAIL

TECHNICAL FIELD

The present invention relates to a communication terminal and a method for creating an e-mail.

BACKGROUND ART

In recent years, various functions for creating e-mails in mobile phones and the like have been developed. Patent Literature 1 describes a character input conversion apparatus for changing priorities of predicted conversion candidates for character inputs according to the content of an incoming mail when a return mail is created in, for example, a mobile phone thereby improving character conversion accuracy and reducing load on character input operations. The character input conversion apparatus in Patent Literature 1 includes an incoming mail analysis device and a character input conversion device. The incoming mail analysis device includes a group information storage unit in which information obtained by grouping words into semantically related groups is stored, and an incoming mail analysis unit ranking each group based on the content of an incoming mail. The character input conversion device includes a character input unit for inputting characters, a predicted conversion priority information storage unit storing priority information of character predictive conversion, an incoming mail content consideration character predictive conversion unit performing character conversion or predictive conversion of characters in accordance with the stored priority and creating a list of conversion candidates, and a character selection determination unit determining conversion characters in the candidate list.

CITATION LIST

Patent Literature

Patent Literature 1: Japanese Patent Application Laid-Open Publication No. 2007-272739

SUMMARY OF INVENTION

Technical Problem

In the conventional technique, for example, according to Patent Literature 1, even if the efficiency of character conversion is increased, users have to input characters to be included in an e-mail one by one, for example, through a keyboard. Therefore, as the number of characters included in an e-mail is larger, the number of times of character inputs increases. Moreover, in a communication terminal such as a mobile phone, a complicated key operation is sometimes required for character input or inputting images, pictograms, and the like. Then, an object of the present invention is to allow an input operation necessary to create an e-mail to be performed efficiently.

Solution to Problem

According to the present invention, a communication terminal having a function of creating an e-mail includes extraction means for extracting predetermined keyword data from text data input for an e-mail, acquisition means for acquiring predetermined associated data associated with the keyword data extracted by the extraction means, based on storage location reference data that indicates a storage location of the associated data and is stored in an internal memory, from the internal memory or from predetermined external equipment through communication, and insertion means for inserting the associated data acquired by the acquisition means into the text data in place of the keyword data. Therefore, the keyword data in the text data for an e-mail is automatically replaced by the associated data associated with the keyword data, so that the user can easily perform input of content indicated by the associated data by including keyword data into text data.

In the present invention, at least one data selected from image data, pictographic data, schedule data representing schedule content, and variable data varying according to a predetermined environmental element may be stored as the associated data in the internal memory. In this manner, a wide variety of associated data can be used.

In the present invention, the acquisition means may acquire image data or pictographic data stored in the internal memory in association with all or part of the associated data, from the internal memory. The insertion means may insert the image data or pictographic data that is associated with all or part of the associated data and is acquired by the acquisition means, into the text data in place of all or part of the associated data. In this manner, when there exists image data or pictographic data related to all or part of the associated data, the image data or pictographic data is used in place of all or part of the associated data. Therefore, the associated data can also be further replaced by image data or pictographic data.

In the present invention, the associated data acquired by the acquisition means may include content corresponding to a situation at a time of acquisition of the associated data by the acquisition means. Therefore, a wide variety of associated data corresponding to the situations can be used.

In the present invention, the associated data may be associated with availability data indicating whether acquisition by the acquisition means is possible or not. The acquisition means may determine whether to acquire the associated data with reference to the availability data. Therefore, the associated data can be used depending on whether it can be used or not as indicated by the availability data.

According to the present invention, a method for creating an e-mail using a communication terminal having a function of creating an e-mail includes an extraction step of the communication terminal extracting predetermined keyword data from text data input for an e-mail, an acquisition step of the communication terminal acquiring predetermined associated data associated with the keyword data extracted in the extraction step, based on storage location reference data that indicates a storage location of the associated data and is stored in an internal memory of the communication terminal, from the internal memory or from predetermined external equipment through communication, and an insertion step of the communication terminal inserting the associated data acquired in the acquisition step into the text data in place of the keyword data. Therefore, the keyword data in the text data for an e-mail is automatically replaced by the associated data associated with the keyword data, so that the user can easily perform input of content indicated by the associated data by including keyword data into text data.

Advantageous Effects of Invention

According to the present invention, an input operation necessary to create an e-mail can be performed efficiently.

BRIEF DESCRIPTION OF DRAWINGS

FIG. 3 is a diagram showing an example of storage location reference data according to the embodiment.

FIG. 4 is a diagram for illustrating the contents of records in a variable DB according to the embodiment.

FIG. 5 is a diagram for illustrating the contents of records in the variable DB according to the embodiment.

DESCRIPTION OF EMBODIMENTS

Figure 1:
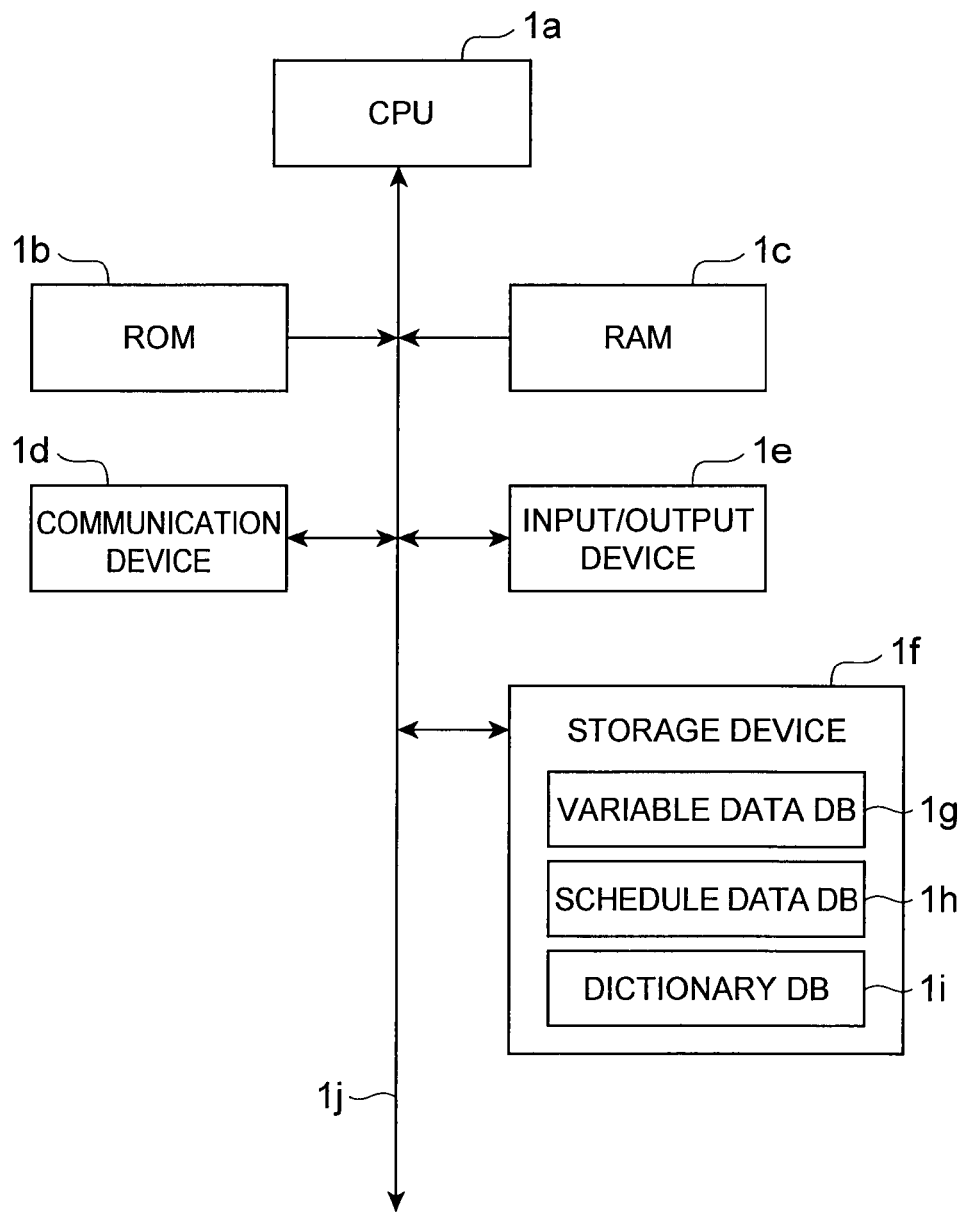
FIG. 1 is a diagram showing a configuration of a communication terminal according to an embodiment.

In the following, a suitable embodiment according to the present invention will be described in detail with reference to the figures. It is noted that in the description of the drawings, the same components are denoted with the same reference numerals, if possible, and the duplicated description will be omitted. A communication terminal 1 according to an embodiment is, for example, a mobile phone that can communicate over a data communication network such as the Internet and can transmit/receive data to/from the outside via such a data communication network. The communication terminal 1 has an e-mail creating function. With the e-mail creating function of the communication terminal 1, the content of an e-mail input as text data is automatically determined, a predetermined keyword (for example, a word having a relatively small number of characters, such as weather or news) is extracted from the content of the e-mail, and associated data (for example, word data, image data, or pictographic data representing the content such as news, weather, or schedules) that is associated with the keyword and matches the current situation (such as time, timing, and place) is inserted into the text data (the content of the e-mail) in place of the keyword. With this e-mail creating function, once a keyword having a relatively small number of characters is input, it can be automatically converted into word data having a larger number of characters as compared with the keyword, or image data and pictographic data that require a predetermined acquisition operation.

As shown in FIG. 1, the communication terminal 1 physically includes a CPU 1a, a ROM 1b, a RAM 1c, a communication device 1d, an input/output device 1e, a storage device 1f, and the like. The CPU 1a to the storage device 1f are connected to a bus 1j. The CPU 1a centrally controls the communication terminal 1 by loading a predetermined computer program stored in an internal memory such as the ROM 1b into the RAM 1c for execution. The communication device 1d has an interface for communicating with external communication equipment (communication terminal) and the like. In particular, it has an interface for communicating with an external information server (a server that provides data indicating news, weather, or the like) via the Internet. The input/output device 1e has an input device such as a keyboard and an output device including a display such as an LCD. The storage device 1f is a writable and readable memory and stores a variety of computer programs (in particular, a computer program for executing a flowchart in FIG. 6) and a variety of data necessary to execute the computer programs (for example, a variable data DB 1g, a schedule data DB 1h, a dictionary DB 1i, and storage location reference data 2 shown in FIG. 3) (DB; database).

Figure 2:
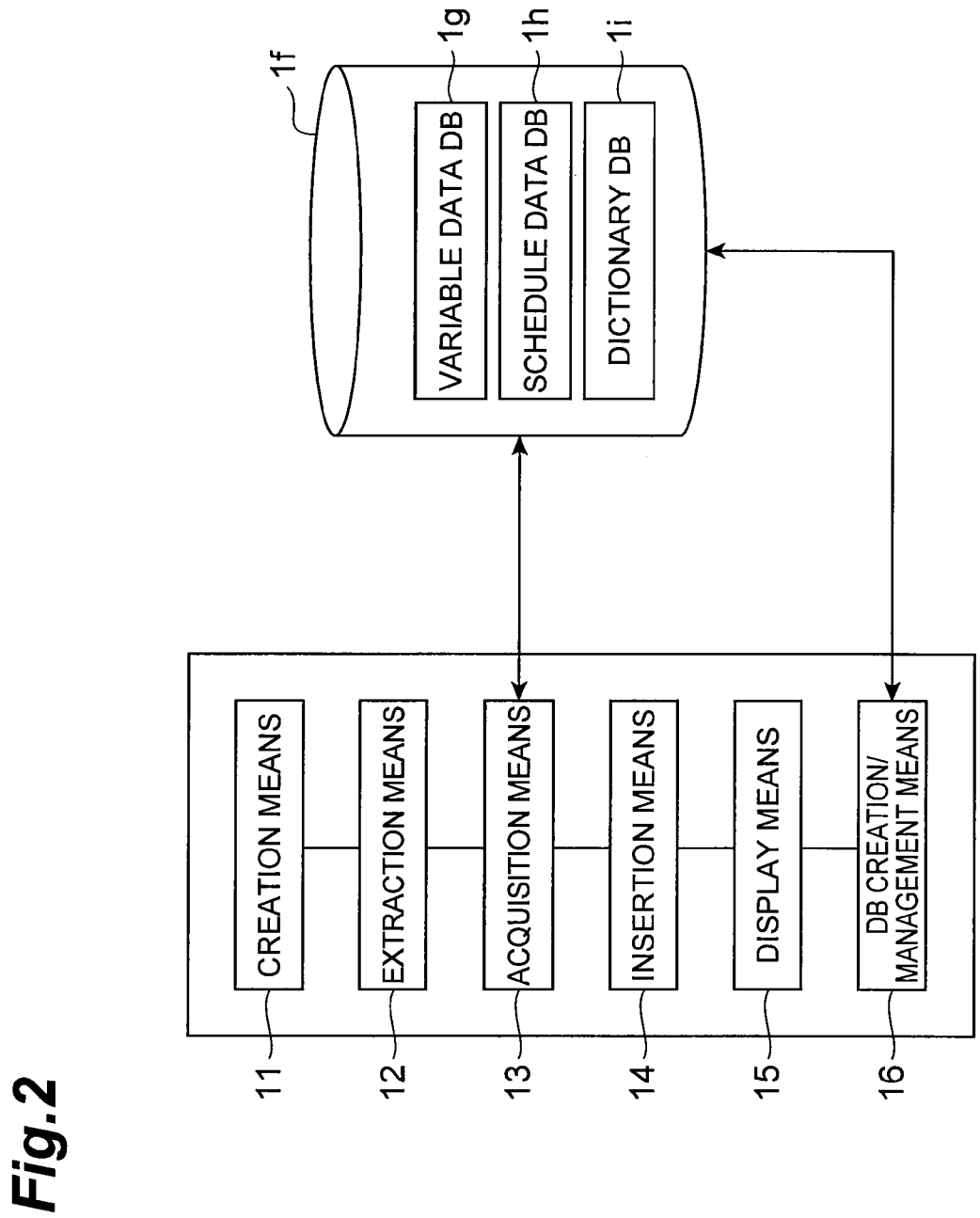
FIG. 2 is a diagram showing a configuration of the communication terminal according to the embodiment.

As shown in FIG. 2, the communication terminal 1 functionally includes creation means 11, extraction means 12, acquisition means 13, insertion means 14, display means 15, and DB creation/management means 16. The creation means 11 to the DB creation/management means 16 are functions implemented by the CPU 1a executing the computer program stored in the internal memory of the communication terminal 1, such as the ROM 1b, to bring each component of the communication terminal 1 shown in FIG. 1 into operation. The CPU 1a executes a process shown in the flowchart in FIG. 6 by executing the computer program (using the creation means 11 to the DB creation/management means 16).

Figure 6:
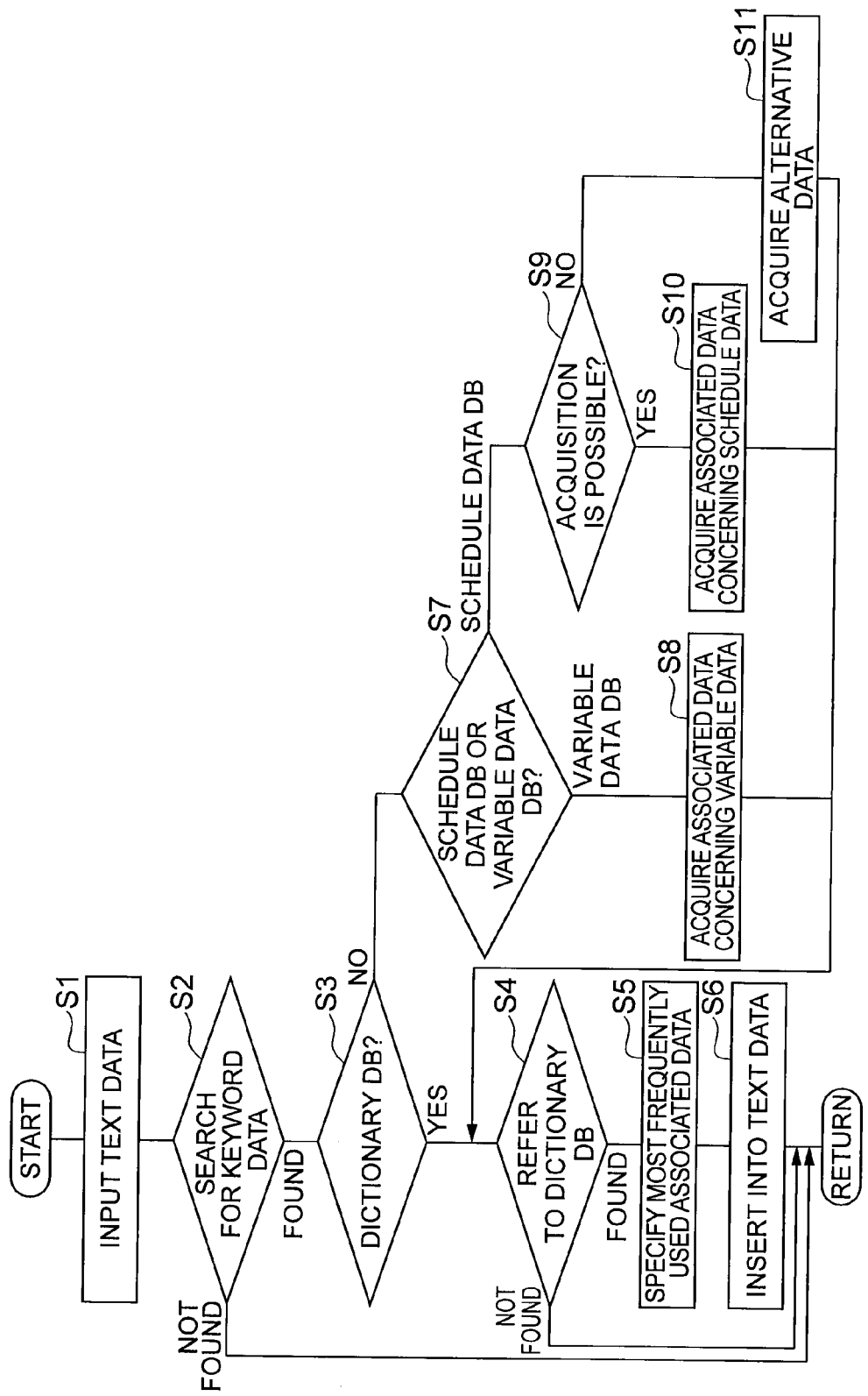
FIG. 6 is a flowchart for illustrating an operation of the communication terminal according to the embodiment.

Referring to FIG. 6, an operation of the communication terminal 1 will be described. First, the creation means 11 acquires text data for an e-mail through the input/output device 1e (step S1). In this case, the user specifies one document template from a plurality of preset document templates (the document templates are stored in the storage device 1f) through the input/output device 1e. For example, an example of the document templates is '"(1)", today "(2)", isn't it?, well I heard "(3)", I'll "(4)" today, I'll contact you when I'm done'. A predetermined keyword is inserted beforehand in each of "(1)", "(2)", "(3)", and "(4)". For example, a keyword "greeting" is inserted in "(1)", a keyword "weather" is inserted in "(2)", a keyword "news" is inserted in "(3)", and a keyword "schedule" is inserted in "(4)". The creation means 11 acquires a document template including such keywords beforehand, as text data for an e-mail.

In the following process (step S2 to step S11), a keyword is extracted by the extraction means 12 from the text data acquired by the creation means 11, associated data that is associated with the extracted keyword is acquired by the acquisition means 13, and the acquired associated data is inserted into a keyword input place (each place of "(1)", "(2)", "(3)", and "(4)") in the template, in place of the keyword, by the insertion means 14. For example, when the associated data for the keyword "greeting" is "hello", the associated data for the keyword "weather" is "the chance of thunderstorm and precipitation is 80% in the afternoon", the associated data for the keyword "news" is "Japanese gold medal rush", and the associated data for the keyword "schedule" is "go to a beauty salon at 17:00", then the content of the document template will be '"hello", today "the chance of thunderstorm and precipitation is 80% in the afternoon", isn't it ?, well I heard "Japan led gold medal count", I'll "go to a beauty salon at 17:00" today, I'll contact you when I'm done".

In the case of a document template that does not include a keyword beforehand, the creation means 11 displays a list of preset keywords (for example, the storage location reference data 2 shown in FIG. 3 as described later) on the display device of the input/output device 1e and prompts the user to perform selection and input of a keyword included in the list, for each of the places "(1)", "(2)", "(3)", and "(4)" through a key operation on the input/output device 1e (or a one-touch operation using an allocated soft key). The creation means 11 acquires the document template including the keywords input in this manner, as text data for an e-mail.

An identifier (for example, tag data) is allocated to each keyword. By using the identifier, the acquisition of an associated word using the storage location reference data 2 can be performed easily and promptly. In the following, it is assumed that an identifier is allocated to a keyword in the present embodiment (data indicating an identifier is attached to data indicating a keyword).

Here, the storage location reference data 2 illustrated in FIG. 3 will be described. The keywords of the storage location reference data 2 are, for example, "weather" and "schedule". The storage location reference data 2 includes data indicating a storage location (indicating the location where associated data is stored, hereinafter referred to as a keyword type, such as, for example, the dictionary DB, "variable data DB/weather", "schedule data DB", "variable data DB/news", or "variable data DB/greeting") of the associated data associated with a keyword. For example, the keyword type of the associated data for the keyword "weather" shown in FIG. 3 is "variable data DB/weather". The keyword type "variable data DB/weather" of the storage location reference data 2 indicates that the associated data for the keyword "weather" (for example, data indicating the weather condition depending on time, place, and so on) can be acquired by accessing a record having a title "weather" included in the variable data DB 1g. The keyword type of the associated data for the keyword "schedule" illustrated in FIG. 3 is "schedule data DB". The keyword type "schedule data DB" of the storage location reference data 2 indicates that the associated data for the keyword "schedule" can be acquired by accessing the schedule data DB 1h. The schedule data DB 1h is managed by a scheduler (an application program) installed in the communication terminal 1.

The storage location reference data 2 also includes the case where the keyword type is "dictionary DB", though not shown in FIG. 3. For example, the keyword type except "variable data DB" and "schedule data DB" is "dictionary DB". The keyword type "dictionary DB" of the storage location reference data 2 indicates that the associated data such as image data and pictographic data can be acquired by accessing the dictionary DB 1i.

The associated data stored in the variable data DB 1g, of which content varies depending on the situations such as time, timing, and place (environmental elements), is data, for example, such as weather or news, which the DB creation/management means 16 downloads from an external server through the communication device 1d and thereby updates at predetermined intervals (individually set for each title). FIG. 4 illustrates the storage location of a record for each title in the variable data DB 1g. For example, the storage location of the record having the title "weather" (the directory name in the variable data DB 1g) is ":info/weather/detail", and the storage location of the record having the title "news" (the directory name in the variable data DB 1g) is ":info/news/top". The creation and management (update) of the variable data DB 1g and the dictionary DB 1i is performed by the DB creation/management means 16. When downloading is not performed within a predetermined time before the present time, for example, because the external server cannot be accessed under the influence of communication status, a not-yet-acquired flag (availability data) indicating that data has not yet been acquired is attached to the record of each title in the variable data DB 1g by the DB creation/management means 16. When a plurality of keyword types are assigned to the same keyword (in particular when it corresponds to both the variable data DB and the dictionary DB), a predetermined priority is given for each keyword type beforehand, and processing is performed according to this priority.

A description will now be given returning to FIG. 6. The extraction means 12 searches the text data input in step S1 for a keyword (step S2). In this case, the extraction means 12 detects a keyword by searching for data (embedded in the text data) indicating an identifier attached to a keyword, and full-text search may be performed on the text data to search for a character string that matches a keyword. If no keyword is included in the text data (step S2; not found), this text data is displayed by the display means 15 on the display device of the input/output device 1e, with the content input in step S1 being unchanged, and is further transmitted to the outside as an e-mail through the communication device 1d.

If a keyword is included in the text data (step S2; found), the extraction means 12 extracts (specifies) the keyword, and then the acquisition means 13 refers to the storage location reference data 2 and determines whether the keyword type of the extracted keyword is the dictionary DB (step S3). If it is determined that the keyword type is the dictionary DB (step S3; YES), the acquisition means 13 refers to the dictionary DB 1i and determines whether the associated data (such as image data or pictographic data) for the keyword is stored in the dictionary DB 1i (step S4). If the associated data for the keyword is not stored in the dictionary DB 1i (step S4; NOT FOUND), the text data input in step S1 is displayed by the display means 15 on the display device of the input/output device 1e, with the input content unchanged, and is further transmitted to the outside as an e-mail through the communication device 1d. If the associated data for the keyword is stored in the dictionary DB 1i (step S4; FOUND), the acquisition means 13 specifies the most frequently used one among the associated data stored in dictionary DB 1i (step S5), and the insertion means 14 inserts the specified associated data into the text data in place of the keyword (step S6). In step S5, the acquisition means 13 may download the associated data such as image data or pictographic data from an external server through the communication device 1d. After step S6, the display means 15 displays the text data having the associated data inserted in place of the keyword in step S6, on the display device of the input/output device 1e, and further transmits the same as an e-mail through the communication device 1d.

A description will now be given returning to step S3. If it is determined that the keyword type of the keyword extracted in step S2 is not the dictionary DB (the keyword type is the schedule data DB or the variable data DB) (step S3; NO), the acquisition means 13 further determines whether the keyword type of the keyword is the schedule data DB or the variable data DB based on the storage location reference data 2 (step S7). If it is determined that the keyword type of the keyword extracted in step S2 is the variable data DB (step S7; the variable data DB), the acquisition means 13 refers to the variable data DB 1g and acquires the associated data for the keyword from the variable data DB 1g (step S8). For example, when the keyword is "greeting", the acquisition means 13 determines that the keyword type is the "variable data DB/greeting" and accesses the record having the title "greeting" in the variable data DB 1g to acquire the associated data for the keyword "greeting" (word data indicating greeting such as "hello") using the present time as a key (the time is counted by the CPU 1a). The contents of records having the title "greeting" are partially illustrated in FIG. 5. A record having the title "greeting" is related to a "greeting word" (for example, "good morning") for each "time slot" (for example, "6:00 to 11:59"). When the keyword is "weather", the acquisition means 13 determines that the keyword type is the "variable data DB/weather" and accesses a record having the title "weather" in the variable data DB 1g to acquire the associated data (data indicating the weather condition corresponding to the time and the like) for the keyword "weather". If a not-yet-acquired flag is attached to a record having the title "weather" in the variable data DB 1g, the acquisition means 13 proceeds to step S11, which will be described later, and acquires alternative data (for example, word data indicating the content such as "not identified") from an alternative data DB (not shown).

If it is determined that the keyword type of the keyword extracted in step S2 is the schedule data DB (step S7; the schedule data DB), the acquisition means 13 refers to the schedule data DB 1h using the present time as a key and determines whether the associated data (schedule content) that is included in the schedule data DB 1h and is related to the present time can be acquired, that is, whether an acquisition restriction flag (availability data) indicating acquisition restriction and the like is attached (step S9). For example, it is determined in step S9 whether an acquisition restriction flag is attached beforehand as a secret matter to the associated data by the user. If it is determined that the associated data can be acquired from the schedule data DB 1h (step S9; YES), the acquisition means 13 acquires the associated data (schedule content) related to the present time from the schedule data DB 1h (step S10). If it is determined that the associated data cannot be acquired from the schedule data DB 1h (step S9; NO), the acquisition means 13 acquires alternative data (word data indicating contents such as "be scheduled" or "not available from when to when") from the alternative data DB included in the storage device 1f (step S11).

After the associated data is acquired in step S8 or step S10, or after alternative data is acquired in step S11, the acquisition means 13 performs processing in step S4 to step S6 as described above. More specifically, in step S4, the acquisition means 13 refers to the dictionary DB 1i and determines whether the associated data (such as image data or pictographic data) associated with part or all of the associated data acquired in step S8 or step S10 (for example, a keyword included in the word data if the associated data is word data) or part or all of the alternative data acquired in step S11 is stored in the dictionary DB 1i (step S4). If it is determined that it is stored (step S4; FOUND), the acquisition means 13 specifies the most frequently used one among the image data or pictographic data stored in the dictionary DB 1i (step S5), and the insertion means 14 replaces part or all of the associated data or part or all of the alternative data with the specified image data or pictographic data and inserts the associated data or alternative data using the image data or pictographic data into the text data in place of the keyword (step S6). After step S6, the display means 15 displays the text data having the associated data or alternative data inserted in place of the keyword in step S6, on the display device of the input/output device 1e, and then further transmits the same as an e-mail to the outside through the communication device 1d.

The operation and effect of the communication terminal 1 according to the embodiment will now be described. The communication terminal 1 according to the embodiment is a communication terminal having a function of creating an e-mail. The communication terminal 1 includes the extraction means 12, the acquisition means 13, and the insertion means 14. The extraction means 12 extracts predetermined keyword data from text data input for an e-mail. The acquisition means 13 acquires predetermined associated data associated with the keyword data extracted by the extraction means 12 from the internal memory (such as the RAM 1c or the storage device 1f) of the communication terminal 1 or from predetermined external equipment through the communication device 1d, based on the storage location reference data 2 that indicates the storage location of the associated data and is stored in the internal memory. The insertion means 14 inserts the associated data acquired by the acquisition means 13 into the text data in place of the keyword data (first mode). Therefore, the keyword in the text data for an e-mail is automatically replaced by the associated data associated with the keyword, so that the user can easily perform input of the content indicated by the associated data by including a keyword into text data.

In the first mode, at least one data selected from image data, pictographic data, schedule data representing schedule content, and variable data varying according to a predetermined environmental element is stored as the associated data in the internal memory (such as the RAM 1c or the storage device 1f) of the communication terminal 1 (second mode). In this manner, a wide variety of associated data can be used.

In the first or second mode, the acquisition means 13 acquires image data or pictographic data stored in the internal memory (such as the RAM 1c or the storage device 1f) of the communication terminal 1 in association with all or part of the associated data (for example, a keyword included in word data if the associated data is the word data), from the internal memory. The insertion means 14 inserts the image data or pictographic data that is associated with all or part of the associated data and is acquired by the acquisition means 13, into the text data in place of all or part of the associated data (third mode). In this manner, when there exists image data or pictographic data related to all or part of the associated data, the image data or pictographic data is used in place of all or part of the associated data. Therefore, the associated data can also be further replaced by image data or pictographic data.

In any of the first to third modes, the associated data acquired by the acquisition means 13 includes the content corresponding to a situation at the time of acquisition of the associated data by the acquisition means 13 (fourth mode). Therefore, a wide variety of associated data corresponding to the situations can be used.

In any of the first to fourth modes, the associated data is associated with a not-yet-acquired flag or acquisition restriction flag indicating whether acquisition by the acquisition means 13 is possible or not, and the acquisition means 13 refers to the not-yet-acquired flag or acquisition restriction flag to determine whether to acquire the associated data (fifth mode). Therefore, the associated data can be used depending on whether it can be used or not as indicated by the not-yet-acquired flag or acquisition restriction flag.

INDUSTRIAL APPLICABILITY

An input operation necessary to create an e-mail can be performed efficiently.

REFERENCE SIGNS LIST 1 communication terminal, 11 creation means, 12 extraction means, 13 acquisition means, 14 insertion means, 15 display means, 1a CPU, 1b ROM, 1c RAM, 1d communication device, 1e input/output device, 1f storage device, 1g variable data DB, 1h schedule data DB, 1i dictionary DB, 1j bus, 2 storage location reference data, 3 greeting word reference table, 16 DB creation/management means.

The invention claimed is:

1. A communication terminal having a function of creating an e-mail, the communication terminal comprising:
   circuitry configured to
      extract predetermined keyword data from text data input for an e-mail;
      determine that a keyword type associated with the extracted predetermined keyword data corresponds to schedule data;
      identify storage location reference data that is stored in an internal memory of the communication terminal and corresponds to a schedule database;
      determine whether schedule data can be acquired from the schedule database based on availability data;
      acquire schedule data from the schedule database based on the storage location reference data when it is determined that the schedule data can be acquired from the schedule database;

acquire alternative data other than the schedule data when it is determined that the schedule data cannot be acquired from the schedule database; and insert the schedule data or the alternative data into the text data in place of the keyword data.

2. A method for creating an e-mail using a communication terminal having a function of creating an e-mail, the method comprising:

extracting predetermined keyword data from text data input for an e-mail;

determining that a keyword type associated with the extracted predetermined keyword data corresponds to schedule data;

identifying storage location reference data that is stored in an internal memory of the communication terminal and corresponds to a schedule database;

determining whether schedule data can be acquired from the schedule database based on availability data;

acquiring schedule data from the schedule database based on the storage location reference data when it is determined that the schedule data can be acquired from the schedule database;

acquiring alternative data other than the schedule data when it is determined that the schedule data cannot be acquired from the schedule database; and inserting the schedule data or the alternative data into the text data in place of the keyword data.

3. The communication terminal of claim 1, wherein the circuitry is further configured to:

determine that a keyword type associated with the extracted predetermined keyword data corresponds to dictionary data;

identify storage location reference data that is stored in the internal memory of the communication terminal and corresponds to a dictionary database;

acquire dictionary data from the dictionary database based on the storage location reference data; and insert the dictionary data into the text data in place of the keyword data.

4. The communication terminal of claim 3, wherein the circuitry is configured to acquire the dictionary data by identifying most frequently used dictionary data corresponding to the extracted predetermined keyword.

5. The communication terminal of claim 3, wherein the dictionary data includes at least one of image data and pictographic data.

6. The communication terminal of claim 1, wherein the circuitry is further configured to:

determine that a keyword type associated with the extracted predetermined keyword data corresponds to variable data;

identify storage location reference data that is stored in the internal memory of the communication terminal and corresponds to a variable data database;

acquire variable data from the variable data database based on the storage location reference data; and insert the variable data into the text data in place of the keyword data.

7. The communication terminal of claim 6, wherein the variable data is selected based on a time at which the variable data is acquired.

8. The communication terminal of claim 7, wherein the predetermined keyword corresponds to a greeting and the circuitry acquires a greeting from the variable data database that is specific to a time of day that the greeting is acquired.

9. The communication terminal of claim 7, wherein the predetermined keyword corresponds to weather and the circuitry acquires weather condition information from the variable data database that is specific to a time of day that the weather condition information is acquired.

* * * * *